United States Patent [19]

Lückel et al.

[11] 4,249,456
[45] Feb. 10, 1981

[54] SERVO-STEERING MECHANISM

[75] Inventors: Joachim Lückel, Paderborn; Rolf Povel, Stuttgart, both of Fed. Rep. of Germany

[73] Assignee: Daimler-Benz Aktiengesellschaft, Fed. Rep. of Germany

[21] Appl. No.: 56,235

[22] Filed: Jul. 10, 1979

[30] Foreign Application Priority Data

Jul. 29, 1978 [DE] Fed. Rep. of Germany ....... 2833316

[51] Int. Cl.³ .............................................. F15B 11/10
[52] U.S. Cl. ........................................ 91/433; 74/499; 91/434
[58] Field of Search ................. 91/433, 434, 401, 224, 91/421; 74/499

[56] References Cited

U.S. PATENT DOCUMENTS

| 3,444,785 | 5/1969 | Katz | 91/434 |
| 3,444,786 | 5/1969 | Forster | 91/434 |
| 3,771,383 | 11/1973 | Forster | 74/499 |
| 4,003,404 | 1/1977 | Burckhardt | 91/433 |
| 4,028,996 | 6/1977 | Jablonsky | 91/401 |

Primary Examiner—Edward J. McCarthy
Attorney, Agent, or Firm—Craig & Antonelli

[57] ABSTRACT

A servo-steering mechanism with a steering nut threadably movably connected with a steering worm and being supported with respect to the working piston of a servomotor to be rotatable and also axially movable by way of compression springs in directions of the steering worm axis. The steering nut is additionally supported in the directions of the steering worm axis with respect to the working piston by way of at least one hydraulic support connected with a hydraulic system of the servomotor of the servo-steering mechanism.

16 Claims, 6 Drawing Figures

FIG. I.

SERVO-STEERING MECHANISM

The present invention relates to a steering mechanism and, more particularly, to a servo-steering mechanism for a motor vehicle which includes a steering nut threadably movably connected with a steering worm and supported with respect to the working piston of the servo mechanism so as to be rotatable and also axially movable by way of a compression spring in the directions of the steering worm axis such as proposed in, for example, U.S. Pat. No. 3,771,383.

In servo-steering mechanisms of the aforementioned type, a rotatable support of the steering nut with respect to the working piston serves for deriving from the steering nut a control signal, dependent upon an angle of the steering deflection of the steering wheel coupled to the steering worm, for the control valve which adjusts the operating pressure of the servo mechanism. On the other hand, compression springs between the steering nut and the working piston in such steering mechanisms are provided for damping shocks introduced into the working piston from the roadway by way of the steering shaft so as to keep such shocks away from the steering wheel.

The aim underlying the present invention essentially resides in providing an arrangement for stabilizing a servo-steering mechanism with respect to its behavior in situations of self-induced oscillations which manifest themselves in a troublesome way for the driver by noticeable vibrations at the steering wheel.

Although such self-induced oscillations could be counteracted by a hydraulic damping of the control valve, such a solution could lead, in certain cases, to an undesirable inertia of the control valve with respect to its reaction to disturbances on the side of the wheels so that deflections which would occur at the steering wheel would be felt as a "bucking".

In accordance with advantageous features of the present invention, the steering nut of the servo-steering mechanism is additionally respectively supported with respect to the working piston by way of at least one hydraulic support connected with the hydraulic system of the servo mechanism in the directions of the steering worm axis. By virtue of this arrangement, the providing of an undesirable inertia of the control valve is avoided so as to advantageously attain the above-noted aim of the present invention.

In accordance with the present invention, the compression springs which, in a conventional servo-steering mechanism, must exhibit a steep spring characteristic to absorb shocks, are designed to be very soft and are hydraulically supported in their supporting function. In this way, the servo-steering mechanism of the invention exhibits a stable, quiet behavior due to a decoupling effect between the steering nut and the working piston attained by the softness of the compression springs. Thereby, the hydraulic damping of the control valve, insofar as still required, can be constructed so as to be relatively weak whereby the control valve responds quickly to any disturbances on the vehicle wheel side.

Advantageously, in accordance with another feature of the present invention, the hydraulic support for the servo-steering mechanism is provided with a damping resistance. In this connection, the damping of the control valve may be constructed to be so weak that the control valve responds particularly quickly to disturbances on the vehicle wheel side with a stable behavior of the steering mechanism against self-induced oscillations.

In the servo-steering mechanism of the present invention, the hydraulic support may operate or function as a pure damping means, the damping resistance of which yields the supporting effect. Advantageously, an arrangement is provided such that a support operating in one direction of the steering worm axis is hydraulically connected to a support operating in the other direction of the steering worm axis.

In accordance with a further feature of the present invention, with a support operating as the damping means, it is advantageous to provide the hydraulic supply for the damping means to connect two supports operating in the opposed directions of the steering worm axis to the same working pressure chamber of the servomotor.

In the servo-steering mechanism of the present invention, a stabilization of the behavior of the system is attained by the softness of the compression springs. To prevent the occurrence of excessive relative movement between the working piston and the steering nut in situations wherein the compression springs are designed to be very soft, which would lead to a load-dependent disturbance of the stationary proportional dependence between the rotating motions of the steering wheel and the steered vehicle wheels, it is further advantageous in the servo-steering mechanism to connect the support with a point of the hydraulic system which is under a load-dependent operating pressure. In this manner, the major portion of the support between the working piston and the steering nut may be taken over by the load-proportional compressive force of the hydraulic support in order to reduce the load dependency of the support, resultant from the compression springs, to a tolerable degree.

In a servo-steering mechanism of the present invention with a support operating in dependence upon the load, the amount of pressure medium conduits required for supplying the load-dependent pressure to the support may advantageously be maintained at a low number by connecting the support to the associated effective working pressure chamber of the servomotor.

Additionally, with a support operating in dependence upon a load, the support can advantageously operate with hydraulic damping of the relative motions between the working piston and the steering nut.

Independently of whether or not the support operates in dependence upon the load, in accordance with another advantageous feature of the servo-steering mechanism of the present invention, the damping resistance in the hydraulic connection is provided between the support and the hydraulic system of the servomotor.

The hydraulic support of the servo-steering mechanism of the present invention can be advantageously constructed so that one of the two hydraulically mutually supported steering mechanism components, namely, the working piston and steering nut, respectively, has a ring cylinder immovable with respect to this component and the other steering mechanism component has a ring-shaped supporting piston cooperating with the ring cylinder.

To minimize the structural expenditure for the supports operating in the directions of the steering worm axis in the servo-steering mechanism of the present invention, advantageously, the supporting piston is constructed so as to be a dual or double-acting piston.

A space-saving construction is advantageously attained in the servo-steering mechanism of the present invention by arranging the ring cylinder and supporting piston concentrically between the working piston and the steering nut.

Additionally, to comply with the legal requirements which prescribe, in case of a failure of the servo support means, a gear-like connection between the steering wheel and the steered vehicle wheels, it is advantageous in the servo-steering mechanism of the present invention to provide a blocking member, which renders the working piston and steering nut immovable relative to each other at least in the directions of the steering worm axis with the blocking member being positively unlocked by an operating device working in dependence upon the hydraulic system of the servomotor when the hydraulic system yields the required operating pressure and with the blocking member being positively locked in situations wherein the required operating pressure is not attained.

Accordingly, it is an object of the present invention to provide a servo-steering mechanism for motor vehicles which avoids, by simple means, shortcomings and disadvantages encountered in the prior art.

Another object of the present invention resides in providing a servo-steering mechanism for motor vehicles which stabilizes the behavior of the steering mechanism upon the occurrence of self-induced oscillations.

A further object of the present invention resides in providing a servo-steering mechanism for motor vehicles which exhibits a stable and quiet behavior.

Another object of the present invention resides in providing a servo-steering mechanism, the control valve of which is capable of quickly responding to any disturbances at the vehicle wheel side.

A still further object of the present invention resides in providing a servo-steering mechanism for a motor vehicle which prevents the occurrence of excessive relative motions between steering mechanism components of the steering mechanism such as the working piston and steering nut.

A further object of the present invention resides in providing a servo-steering mechanism for a motor vehicle wherein at least one hydraulic support is provided for mutually supporting the steering mechanism components of the mechanism.

A still further object of the present invention resides in providing a servo-steering mechanism for motor vehicles which is simple in construction and therefore relatively inexpensive to manufacture.

Another object of the present invention resides in providing a servo-steering mechanism which is compact in construction.

A further object of the present invention resides in providing a servo-steering mechanism for motor vehicles which functions reliably under all operating conditions.

These and other objects, features, and advantages of the present invention will become more apparent from the following description when taken in connection with the accompanying drawings which show, for the purposes of illustration only, several embodiments in accordance with the present invention, and wherein.

Figure 1:
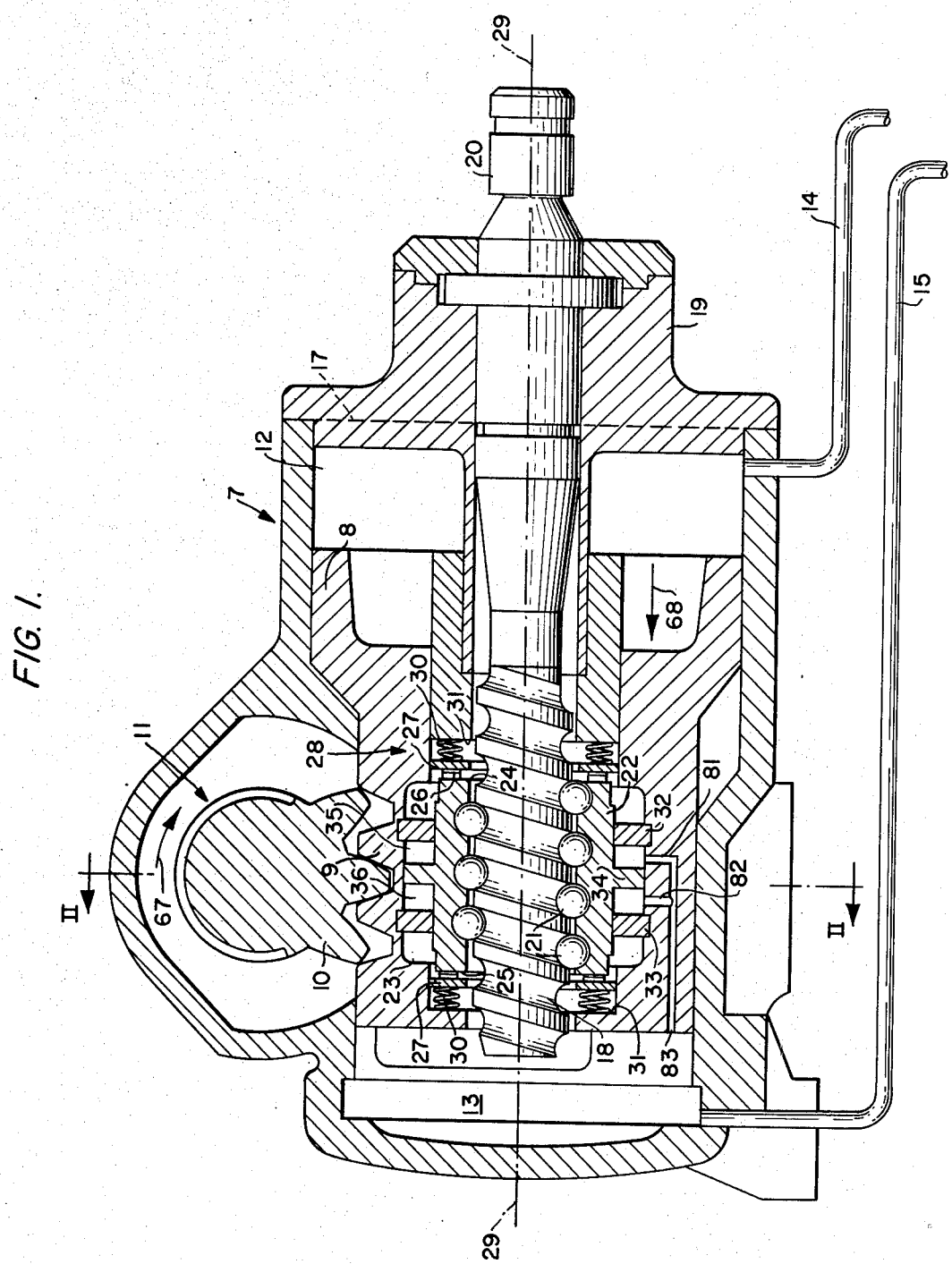
FIG. 1 is an axial cross-sectional view, containing the steering worm axis, of a first embodiment of a servo-steering mechanism in accordance with the present invention.
Figure 5:
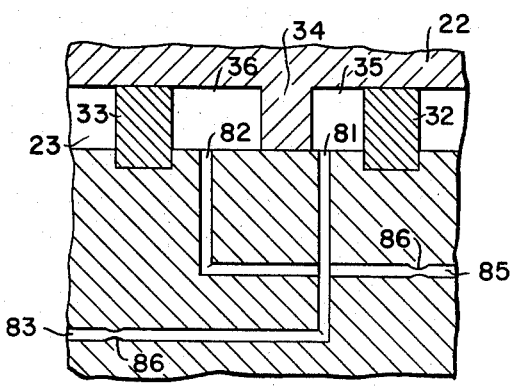
Figure 6:
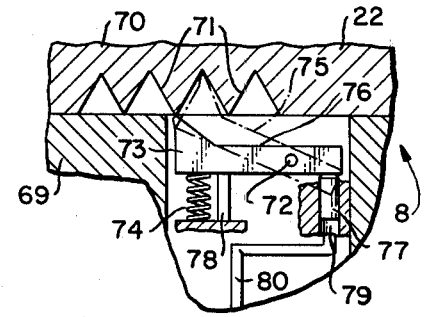

FIG. 5 is a partial axial cross-sectional view, corresponding to the axial section in FIG. 1, of yet another embodiment of a servo-steering mechanism in accordance with the present invention; and FIG. 6 is an axial partial cross-sectional view of a blocking member which may be utilized in all of the embodiments of the present invention, for blocking a relative motion between a working piston and steering nut of a servo mechanism in accordance with the present invention.

Referring now to the drawings wherein like reference numerals are used throughout the various views to designate like parts, the several embodiments of the present invention conform to one another with respect to the following features. More particularly, as shown in FIG. 1, a housing 7, fashioned as a pressure medium cylinder, has displaceably guided therein a working piston 8 which is provided with a rack profile 9 adapted to mesh with a toothed segment 10 of a steering shaft 11 which is rotatably supported in the housing 7 in a manner not illustrated in detail in the drawings. The working piston 8 subdivides the housing 7 into two working pressure chambers 12, 13 which are respectively connected by way of one working pressure line 14, 15 to a control valve 16 (FIG. 2) which is integrally formed with the housing 7.

As also shown in FIG. 1, a housing lid 19 is provided for sealing a mounting aperture or opening 17 of the housing 7 which aperture is provided so as to enable the introduction of the working piston 8 into the housing 7. The steering worm 18 is supported in the housing lid 19 so as to be rotatable but axially immovable. A steering wheel spindle section 20, coupled for movement with the steering worm 18, penetrates the housing lid 19 and extends out of the housing 7. The steering wheel spindle section 20 is adapted to be connected to a steering wheel (not shown) with the steering shaft 11 being coupled, in a conventional manner, by means of a steering pitman arm (not shown), with the steered vehicle wheels (not shown).

A steering nut 22 is threadedly movably connected to the steering worm 18 by way of an interposed recirculating ball unit 21 with the steering nut 22 being received in a recess 23 provided in the working piston 8. The steering nut is respectively provided at its end faces with working surfaces 24, 25 for an axial needle bearing 26 which cooperates on its side opposite to the steering nut 22 with ball races 27.

The ball races 27, radially guided in a stepped portion generally designated by the reference numeral 28 of the recess 23, are arranged so as to be movable with respect to the working piston in the directions of the steering worm axis 29—29. The ball races 27 are resiliently supported on a side opposite to the axial needle bearing 26 by way of soft helical compression springs 30 against a radial abutment surface 31 of the shoulder 28.

Two annular cylinder end walls 32, 33 are inserted in the recess so that they are immovable with respect to the working piston 8. A collar 34, operating as a dual or double-acting supporting piston, is provided at the periphery of the steering nut 22 and engages the inner peripheral walls of the working piston 8 between the cylinder end walls 32, 33. The collar 34 functioning as a support piston subdivides the annular cylinder chamber between the cylinder end walls 32, 33 into two pressure chambers 35, 36. The collar 34 and the pressure chambers 35 or 36 respectively form one hydraulic support for supporting the steering nut 22 with respect to the working piston 8 in the directions of the steering worm axis 29—29 with the compression springs 30 being arranged respectively parallel therewith.

Figure 2:
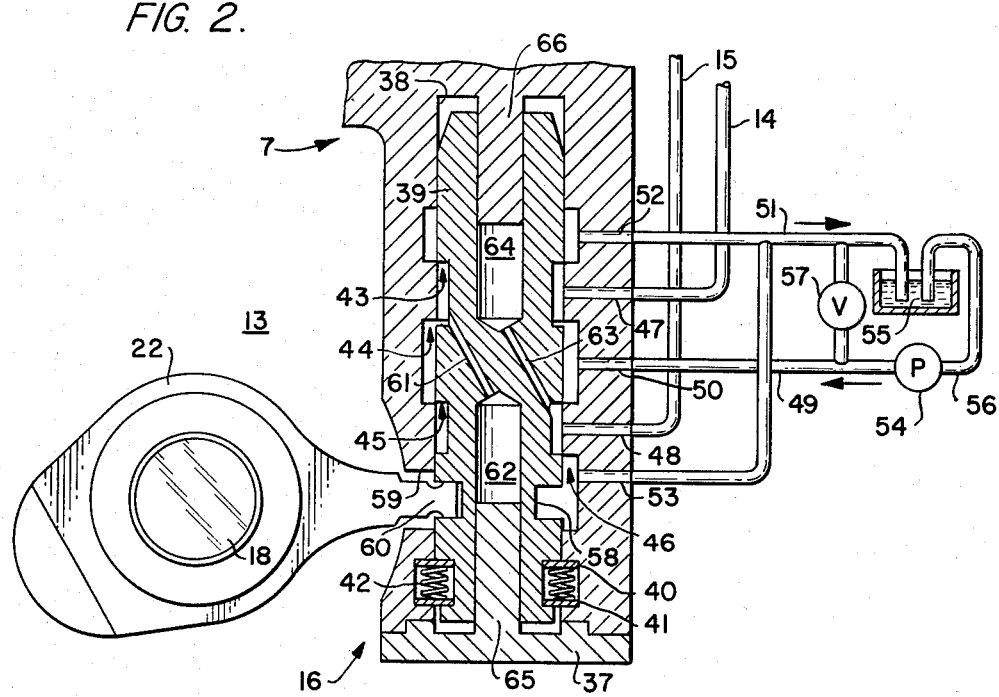
FIG. 2 is a cross-sectional view taken along the line II—II in FIG. 1.

To structurally integrate the control valve 16 into the servo-steering system, as shown in FIG. 2, the housing 7 is provided with a valve housing bore 38 for accommodating a control slide valve 39 with the valve housing bore 38 being sealed off in a pressure-tight manner by a lid 37. The control slide valve 39 is held, in its illustrated neutral position for straightforward driving, by centering springs 42 which are clamped, with pretensioning, between two spring ring plates 40, 41.

In the illustrated neutral position, four control edge pairs generally designated by the reference numerals 43, 44, 45, 46, at the control slide valve 39 and at the valve housing bore 38 are disposed with respect to one another in such a manner that respectively one valve connection 47, in communication with the working pressure line 14, and one valve connection 48, in communication with the working pressure line 15, are each connected with a valve connection 50, in communication with a pump pressure line 49 as well as with a valve connection 52 and 53, respectively, which connections 52, 53 are in communication with a substantially pressure-relieved return or backflow line 51.

The pump pressure line 49 is supplied by a pressure pump 54 driven by the drive engine of the vehicle. The pressure pump 54 is capable of delivering a sufficiently high working pressure even at an idling speed of the drive engine. The return or backflow line 51 leads to a pressure medium reservoir 55 from which the pressure medium is drawn by way of a suction line 56. A pressure control means 57 is inserted between the lines 49, 51 in order to limit the pressure in the line 49. The pressure control means 57 may be of the type disclosed in, for example, German Patent Application No. P 27 10 001.

A control bar or actuating arm 60 is integrally formed with the steering nut 22 with the arm 60 extending, with clearance, into an opening 59 of the housing 7 between the working pressure chamber 13 and the valve housing bore 38. The actuating arm or control bar 60 engages into a peripheral groove 58 of the control slide valve 39.

As shown in FIG. 2, the control slide valve 39 is provided with a reaction pressure chamber 62 which is in constant communication with the valve connection 47 of the working pressure chamber 12 by way of an inclined or slide duct 61. The control slide valve 39 also includes a reaction pressure chamber 64 which is in constant communication with the valve connection 48 of the working pressure chamber 13 by way of an inclined or slide duct 63. Reaction pistons 65, 66 are disposed in the respective reaction chambers 62, 64. The reaction pistons 65, 66 are fixedly or immovably mounted with respect to the valve housing and/or housing 7 so that a manual steering moment proportional to a load-dependent operating pressure of the respective working pressure chambers 12 or 13 makes itself felt at the steering wheel by way of the control bar or actuating arm 60, the steering nut 22, and the steering worm 18.

On the other hand, in case of a shock from a vehicle wheel transmitted by the steering shaft 11 to the operating piston 8 as well as a concomitant pressure increase in one of the working pressure chambers 12, 13, the control slide valve 39 is operated, due to its connection with the working piston 8, in such a manner that a pressure increase is triggered in the other working pressure chamber counteracting the shock on the side of the vehicle wheel.

In case of a steering deflection at the steering wheel rotating the steering shaft 11 in a direction of the arrow 67 in FIG. 1, the control bar or actuating arm 60 operates the control slide valve 39 in a direction toward the lid 37 (FIG. 2). Consequently, the pressure medium connection between the valve connection 47 of the working pressure chamber 12 and the neighboring valve connection 52 of the backflow or return line 51 is throttled by the pair of control edges 43; whereas, the pressure medium connection of the valve connection 48 of the other working pressure chamber 13 to the adjoining valve connection 53 of the backflow or return line 51 is opened up to a greater extent. In the same manner, the pressure medium connection of the valve connection 50 of the pressure pump 54 to the valve connection 47 of the supporting working pressure chamber 12 is opened up to a larger extent by the positioning of the pair of control edges 44; whereas, the pressure medium connection of the valve connection 50 to the valve connection 48 of the other working pressure chamber 13 is throttled by the pair of control edges 45. Due to the thus set pressure differential between the two working pressure chambers 12 and 13, a differential pressure force exists at the working piston 8 which is effective in the direction of the arrow 68 of FIG. 1. In case of an oppositely directed steering angle or deflection of the steering wheel, the higher pressure is correspondingly set by the control valve 16 in the working pressure chamber 13.

As shown in FIG. 6, the working piston 8 and steering nut 22 have overlapping wall sections 69, 70 with the wall sections 70 being provided with sawtooth-like detents 71 which are adapted to be engaged by a pawl 73, pivotably arranged on a pivot axle 72 in the wall section 69. The pawl 73 is under the action of a compression spring 74 so that, in a locked condition 75, indicated in phantom lines, the working piston and steering nut 22 are immovably fixed with respect to each other at least in the directions of the steering worm axis 29—29.

In the released condition 76, illustrated in full lines, the pawl 73 is maintained, by means of a release piston 77, in contact against an abutment 78 of the wall section 69. The release piston 77 operates in a cylindrical bore 79 of the wall section 69 with the cylindrical bore 79 being in communication, by way of a pressure duct 80 provided in the wall section 69, in a manner only schematically illustrated, and by way of a pressure duct of the housing 7, with the valve connection 50 of the pressure pump 54.

The effective cross section of the release piston 77 exposed to the pressure in the cylindrical bore 79 is adapted to the pressure value of the pump pressure line 49 as set by the pressure control unit 57 so that, once this pressure value has been attained, the spring bias of the compression spring 74 is overcome by the pressure force of the release piston 77 and, consequently, the pawl 73 is brought into the released position 76.

In the embodiment of FIGS. 1 and 2, the two pressure chambers 35, 36, for hydraulic support between the working piston 8 and the steering nut 22, are respectively connected by one pressure duct 81, 82 and a common connecting duct 83 with the working pressure chamber 13. The supporting piston 34 operates as a pure damping piston. In this connection, the ducts 81, 82, 83 can themselves act as a damping resistance by an appropriate dimensioning of the ducts 81–83 to have a narrow cross section. Likewise, the supporting piston 34 could have throttle connections between the pressure chambers 35 and 36 to also obtain a damping resistance.

Figure 3:
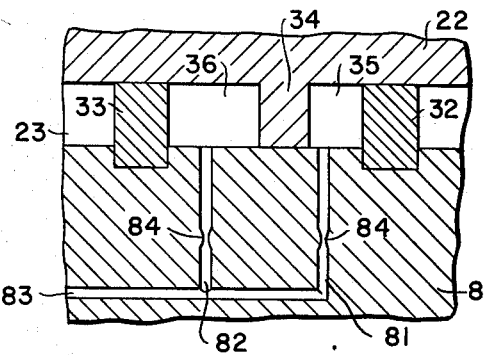
FIG. 3 is a partial cross-sectional view, corresponding to the axial section in FIG. 1, of another embodiment of the servo-steering mechanism in accordance with the present invention.

In the embodiment illustrated in FIG. 3, the supporting piston 34 likewise operates as a pure damping piston. To obtain a damping resistance, fixed or adjustable throttles 84 are arranged in the pressure ducts 81, 82. In all other respects, the embodiment of FIG. 3 coincides with the first embodiment of FIGS. 1 and 2.

Figure 4:
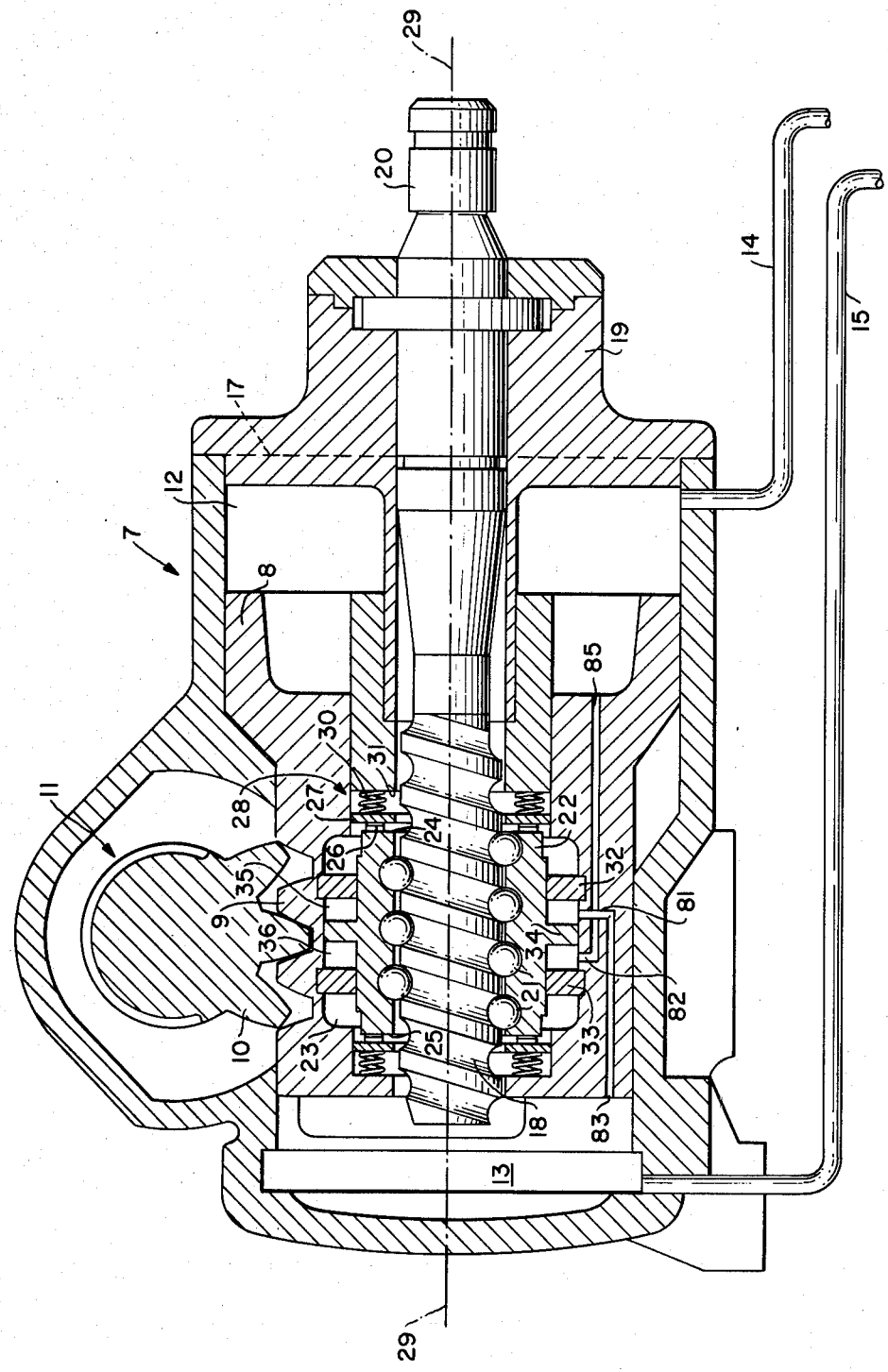
FIG. 4 is a partial axial section, corresponding to the axial section of FIG. 1, of a further embodiment of a servo-steering mechanism in accordance with the present invention.

The embodiment of FIG. 4 differs from the first two embodiments of FIGS. 1–3 in that the pressure chambers 35 and 36 are placed under a load-dependent operating pressure of the respective operative working pressure chambers 12 or 13. For this purpose, the pressure duct 82 of the pressure chamber 36 is connected by way of its own connecting duct 85 to the other working pressure chamber 12. In all other respects, the embodiment of FIG. 4 corresponds with the embodiment of FIGS. 1 and 2.

The embodiment of FIG. 5 differs from the embodiment of FIG. 4 in that fixed or adjustable throttles are arranged in the pressure medium connections between the respective pressure chambers 35 and 36 and the respective associated effective working pressure chambers 13 and 12.

While we have shown and described several embodiments in accordance with the present invention, it is understood that the same is not limited thereto, but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A servo-steering mechanism which includes a steering nut threadably movably connected with the steering worm, and compression spring means for supporting the steering nut with respect to a working piston of the servo mechanism so as to be rotatable and axially movable in directions of a longitudinal axis of the steering worm, characterized in that at least one hydraulic support means is operatively connected with a hydraulic system of the servo mechanism for additionally supporting the steering nut with respect to the working piston in the directions of the steering worm axis.

2. A servo-steering mechanism according to claim 1, characterized in that a damping resistance means is provided for damping the hydraulic support means.

3. A servo-steering mechanism according to one of claims 1 or 2, characterized in that two hydraulic support means are provided with one of the hydraulic support means being adapted to operate in one direction of the axis of the steering worm and the other hydraulic support means being adapted to operate in the other direction of the axis of the steering worm, and in that means are provided for hydraulically connecting the two hydraulic support means to each other.

4. A servo-steering mechanism according to claim 3, characterized in that means are provided for connecting the two hydraulic support means to a single working pressure chamber of the servo mechanism.

5. A servo-steering mechanism according to one of claims 1 or 2, characterized in that hydraulic connection means are provided for connecting the at least one hydraulic support means to a portion of the hydraulic system of the servomotor so as to enable a load-dependent hydraulic support of the hydraulic support means.

6. A servo-steering mechanism according to claim 5, characterized in that the portion of the hydraulic system is a working pressure chamber means of the servo mechanism.

7. A servo-steering mechanism according to claim 6, characterized in that a damping resistance means is disposed in the hydraulic connection means at a position location between the hydraulic support means and the hydraulic system of the servo mechanism.

8. A servo-steering mechanism according to claim 7, characterized in that annular ring means for forming a ring cylinder are provided on one of the working piston and the steering nut so as to be movable therewith, and in that a supporting piston means is disposed on the other of said working piston means and steering nut and is mounted so as to be displaceable in the ring cylinder.

9. A servo-steering mechanism according to claim 8, characterized in that the supporting piston means is constructed as a double-acting piston.

10. A servo-steering mechanism according to claim 9, characterized in that the ring cylinder and supporting piston means are concentrically disposed between the working piston and the steering nut.

11. A servo-steering mechanism according to claim 10, characterized in that blocking means are provided for immovably fixing the working piston and the steering nut in a position with respect to each other at least in the directions of the axis of the steering worm, and in that means operating in dependence upon a pressure of the hydraulic system are provided for positively releasing the blocking means upon the hydraulic system of the servo mechanism yielding a required operating pressure and for positively locking the blocking member upon a failure of the hydraulic system to attain the required operating pressure.

12. A servo-steering mechanism according to one of claims 1, 2, or 3, characterized in that a damping resistance means is disposed between the hydraulic support means and the hydraulic system of the servo mechanism.

13. A servo-steering mechanism according to one of claims 1, 2, or 3, characterized in that annular ring means for forming a ring cylinder are provided on one of the working piston and the steering nut so as to be movable therewith, and in that a supporting piston means is disposed on the other of said working piston means and steering nut and is mounted so as to be displaceable in the ring cylinder.

14. A servo-steering mechanism according to claim 13, characterized in that the supporting piston means is constructed as a double-acting piston.

15. A servo-steering mechanism according to claim 14, characterized in that the ring cylinder and supporting piston means are concentrically disposed between the working piston and the steering nut.

16. A servo-steering mechanism according to one of claims 1, 2, or 3, characterized in that blocking means are provided for immovably fixing the working piston and the steering nut in a position with respect to each other at least in the directions of the axis of the steering worm, and in that means operating in dependence upon a pressure of the hydraulic system are provided for positively releasing the blocking means upon the hydraulic system of the servo mechanism yielding a required operating pressure and for positively locking the blocking member upon a failure of the hydraulic system to attain the required operating pressure.

* * * * *